United States Patent [19]

Gentry

[11] Patent Number: 4,901,470
[45] Date of Patent: Feb. 20, 1990

[54] COILED SPRING SPINNER FISHING LURE

[76] Inventor: Donald D. Gentry, P.O. Box 64, Carterville, Ill. 62918

[21] Appl. No.: 225,856

[22] Filed: Jul. 29, 1988

[51] Int. Cl.⁴ ............................................. A01K 85/00
[52] U.S. Cl. .................................... 43/42.13; 43/42.72
[58] Field of Search ................. 43/42.12, 42.13, 42.14, 43/42.72, 42.74

[56] References Cited

U.S. PATENT DOCUMENTS

| | | | |
|---|---|---|---|
| 2,471,499 | 5/1949 | Shipman | 43/42.13 |
| 3,257,750 | 6/1966 | Shannon | 43/42.13 |
| 4,003,154 | 1/1977 | Carver | 43/42.13 |
| 4,079,539 | 3/1978 | Holstein | 43/43.13 |
| 4,625,448 | 12/1986 | Borders | 43/42.13 |
| 4,738,047 | 4/1988 | Ryan | 43/42.39 |
| 4,745,700 | 5/1988 | Davis | 43/42.13 |
| 4,765,085 | 8/1988 | Wotawa et al. | 43/42.13 |
| 4,793,089 | 12/1988 | Long et al. | 43/42.13 |

Primary Examiner—M. Jordan
Attorney, Agent, or Firm—L. S. Van Landingham, Jr.

[57] ABSTRACT

The invention is concerned with a spinner fishing lure of novel design, construction and function, which eliminates the conventional wire harness commonly used in the prior art. The inventive lure is completely snagless and weedless, and it is capable of being retrieved at any desired depth. Upon retrieval, the lure moves from side-to-side and zig-zags in imitation of the movements of a swimming bait fish, and it also pulsates and vibrates vigorously to additionally attract any fish in the vicinity. Additional features and advantages of the inventive lure are set out in the detailed description.

20 Claims, 5 Drawing Sheets

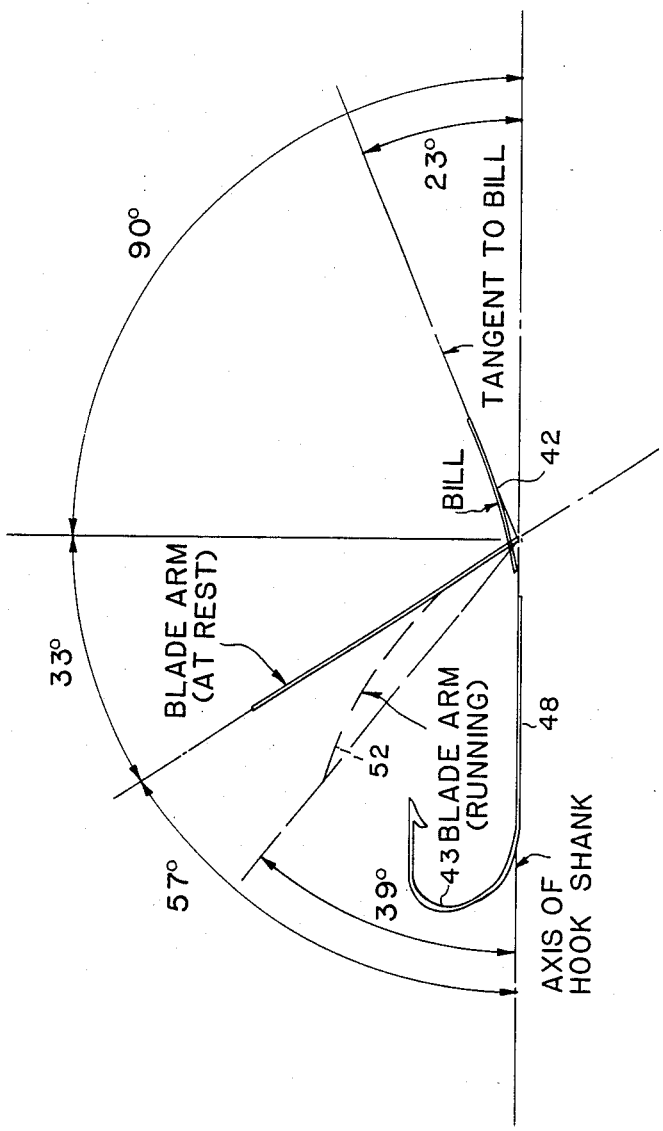

COILED SPRING SPINNER FISHING LURE

THE BACKGROUND OF THE INVENTION

1. The Field of the Invention

This invention broadly relates to spinner fishing lures. In one of its more specific aspects, the invention is concerned with a spinner fishing lure of novel construction, design and function which eliminates the conventional wire harness commonly used in the prior art.

2. The Description of the Prior Art

Spinner fishing lures of the wire harness type are widely used at the present time. Examples of prior art lures of this type are disclosed in U.S. Pat. Nos. 3,143,824, 3,253,363, 3,808,726, 4,003,154, 4,011,681, 4,033,065, 4,074,454, 4,158,927, 4,209,932 and 4,571,877.

FIG. 1 of the drawings also illustrates a typical prior art commercially available wire harness spinner lure. Referring now to FIG. 1, the prior art spinner lure generally designated as 20 includes a "safety pin" wire harness 30 which includes an eye 21, a first lengthy divergent arm 22 connected to weighted body 23 and hook 24, and a second lengthy divergent arm 25 connected to swivel 26, which in turn is connected to spinner blade 27. A rubber skirt 28 provided with a plurality of rubber tails 29 is attached to the trailing end of weighted body 23 to hide hook 24, and a fishing line 31 is tied to eye 21 to pull lure 20 in the direction of the extended line 31.

The above-described prior art spinner lures have a number of limitations and disadvantages which are inherent in their design, construction, and materials of manufacture. For example, the "safety pin" wire harness commonly used in lures of this type is especially troublesome and it would be very advantageous to eliminate it. The wire harness is easily bent out of shape on contact with underwater objects such as rocks, logs and stumps, and requires frequent re-tuning in order to retrieve properly. The fisherman is also limited with a given wire harness and weighted body combination in the size of spinner blades that can be used therewith. The shape of the wire harness and the distance to the weighted body, the distance from the arm bend to the spinner blade, and the distance between the hook and the harness wire are all factors that must be contended with in sizing the proper spinner blade to a given lure. Thus, the manufacturer must select the desired type of spinner blade to be used, which is usually a Colorado or round spinner blade, a willow leaf or long spinner blade, or an Indiana or oblong spinner blade, and then select the desired size thereof, which may vary from size 1 to size 8, and thereafter size the wire harness and weighted body to the selected blade. Otherwise, a rolling action takes place upon retrieval that will tangle the fishing line and upset the natural and desired action of the lure. It is not possible to simply change the spinner blade at a cost of a few cents when a different size is desired under given fishing conditions. The fisherman must buy additional complete lures at a cost of several dollars each with the desired blade sizes already assembled thereon. It would be very desirable and cost efficient to be able to replace the spinner blade with any desired blade type or size rather than purchase complete lures.

The prior art spinner lures are very sensitive to the speed and manner of retrieval. They must be retrieved at certain rates for varying spinner blade sizes and shapes in order to obtain suitable lure action. There is also no side-to-side and/or wiggling action to imitate a bait fish as retrieval of the lure is in a straight line from the point of fall to the rod tip. Depth control is not maintained during retrieval and the lure is gradually pulled up toward the point of retrieval from the initial depth at the point of fall. Depth control is especially important to fishermen competing in tournaments as electronic depth finders are commercially available which indicate the presence of fish and their depth. The lure must run at the proper depth for the fish to see the lure and thereby assure a maximum number of strikes.

The wire in the prior art wire harness spinner lures must be stiff and heavy to avoid breakage and/or frequent re-tuning, and it is usually of a diameter of 32/thousandths of an inch or larger. The use of such heavy wire and a lengthy wire harness greatly reduces vibration and/or pulsation in the body and skirt of the lure, and this in turn decreases its attractiveness to fish as vibration created by the rotating flashing blades of a spinner lure is one of its most important features.

In the lure of FIG. 1 described above, the vibration created by spinner blade 27 must travel down the long heavy stiff arm 25 to eye 21, and at that point, a substantial amount of its vibration intensity is lost to line 31 and travels up the lengthy line to the fisherman, and then back to eye 21. The intensity of the vibration by-passing eye 21 and reaching arm 22 is greatly reduced, and it is then further reduced upon traveling down the long heavy stiff arm 22 to body 23 and skirt 28. Heavy wire is much less efficient in transmitting vibration than thin wire, and long lengths of the wire further decrease the efficiency. As a result, the prior art wire harness spinner lures were able to use effectively only a fraction of the vibration created by the spinner blades.

The prior art spinner lures additionally were not completely snagless and weedless, and this reduced their effectiveness when fishing in heavy weeds, reeds and other vegitation, rocks, stumps, overhanging tree limbs, and other difficult fishing conditions. A completely snagless and weedless spinner lure would have many advantages and has been long sought in this art.

The aforementioned and other deficiencies and disadvantages of the prior art spinner lures have been recognized by those skilled in this art. However, an entirely satisfactory alternative thereto was not available prior to the present invention.

THE SUMMARY OF THE INVENTION

The present invention overcomes the disadvantages and deficiencies of the prior art wire harness spinner lures. This is accomplished by providing a spinner fishing lure characterized by the novel and improved construction, design and function described and claimed hereinafter.

In one presently preferred embodiment, the spinner fishing lure of the invention comprises an elongated weighted body means having first leading and trailing end portions, an elongated bill means having second leading and trailing end portions, and an elongated hook means including shank and point portions. The bill means extends from the first leading end portion of the body means and is fixedly connected to the body means adjacent its second trailing end portion. The shank portion of the hook means extends from the trailing end portion of the body means and is fixedly connected to the body means. An elongated flexible spinner blade arm means having third leading and trailing end portions is fixedly connected to the body means at a position removed from the respective outer ends of the first leading and trailing end portions thereof, and is angularly disposed and extends outwardly from the body means and toward the first trailing end portion. The elongated body means and hook means, and also preferably the bill means, extend generally longitudinally and the longitudinal axes thereof lie in substantially the same plane. The arm means and the point portion of the hook means are on the same side of the longitudinal axes thereof and are spaced from each other. Means is provided for attaching a fishing line to the second leading end portion of the bill, and fish attracting spinner blade means is provided and is carried by the arm means.

It will be appreciated by those skilled in this art from the description of the above mentioned embodiment, from the accompanying drawings and the detailed description of the invention appearing hereinafter, that the invention is concerned with a spinner fishing lure of novel construction, design and function which eliminates the conventional wire harness commonly used in the prior art and the aforementioned problems caused thereby. The spinner lure of the invention does not require constant re-tuning, and it is not limited to a restricted type and size of spinner blade. Thus the manufacturer may select any desired type of spinner blade and size thereof from one to eight in constructing the completed lure, and the fisherman may replace the original spinner blade with any desired type or size one to eight spinner blade at a cost of a few cents. It is no longer necessary to buy a series of complete lures having a variety of types and sizes of spinner blades.

It is a further object of the invention to provide a spinner fishing lure which is capable of side-to-side and/or wiggling action which imitates a bait fish as the lure is retrieved, and to thereby increase greatly the attractiveness of the lure to fish. The lure of the invention is also capable of maintaining its depth from the initial depth at the point of fall up to substantially the point of retrieval, and this enables a fisherman to effectively use electronic depth-finding apparatus currently commercially available which indicates the presence of fish and their depth. The lure of the invention is allowed to sink to the desired depth at the point of fall, and is then retrieved at that depth throughout substantially the entire retrieval step.

It is also an object of the invention to provide a spinner fishing lure that is completely snagless and weedless, and that may be cast into the heaviest weed cover, log jams, lilly pads, reed beds and hydrilla without becoming fouled, and which may be inadvertently cast into overhanging tree branches and allowed to drop therethrough without becoming fouled or snagging. The prior art spinner lures are not capable of accomplishing this, and the present invention provides a completely snagless and weedless spinner fishing lure for the first time.

It is a further important object of the invention to provide a spinner fishing lure which is capable of utilizing substantially all of the vibration created by the rotating and flashing spinner blades. In the present invention, the spinner blade arm is flexible and thus is capable of transmitting vibration more efficiently, and additionally, the flexible spinner blade arm is attached to the weighted body. Thus, the vibration is transmitted directly to the weighted body without losing intensity by first having to pass through other components of the lure. As a result, the weighted body and any objects attached thereto such as a skirt, are caused to vibrate and/or pulsate extremely vigorously, thereby causing the lure to be more attractive to fish and increasing the number of strikes. The flexible wire spinner blade arm or cable is also knocked aside easily when a fish strikes and does not interfere as a heavy stiff wire would do. Additionally, the flexible wire or cable tends to lie close to the hook during retrieval, and yet enough clearance is given between the hook and the spinner blade arm and spinner to prevent fouling. This assures proper operation of the spinner lure during retrieval, and also enhances the side-to-side movement discussed above. The side-to-side or wiggling action occurs upon the slightest turn of the reel handle upon retrieval, and it continues throughout the retrieval regardless of the speed thereof. The bill extending from the weighted body, and to which the line is attached, also provides more flash and is substantially equivalent to another spinner blade in this respect. The bill additionally aids in enhancing the side-to-side or wiggling action. The present invention provides still further objects and advantages as will be apparent from the discussion hereinafter and the accompanying drawings.

THE BRIEF DESCRIPTION OF THE ACCOMPANYING DRAWINGS

The invention will be described hereinafter in greater particularity with reference to the presently preferred embodiments thereof illustrated in the accompanying drawings, wherein:

FIG. 13 is a diagrammatic view illustrating the angular relationship of certain component parts of one presently preferred embodiment of the spinner fishing lure of the invention.

THE DETAILED DESCRIPTION OF THE INVENTION

Figure 1:
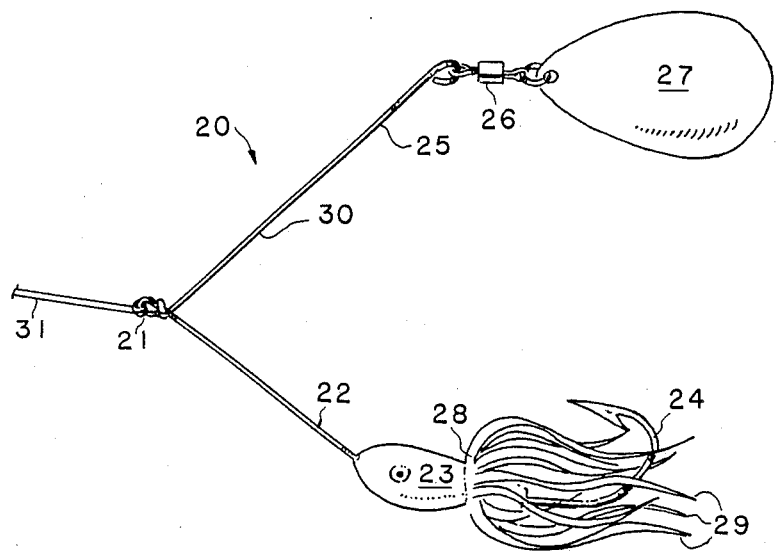
FIG. 1 is a side view of a typical prior art wire harness spinner fishing lure.

Referring now to the drawings, and more particularly to FIGS. 2, 3, 4, 6, and 7, the spinner fishing lure of the invention generally designated as 40 includes an elongated weighted body 41, an elongated bill 42 and an elongated hook 43. The body may be molded from hot lead or a lead alloy, such as a high strength alloy of 90% lead and 10% tin, in the general configuration of the head and adjacent body portion of a bait fish and it may include bulging eyes and recessed pupils 44 to give a more realistic appearance. The size and weight of body 41 may vary over suitable wide ranges, but for many lures, the maximum width is about 0.405 inch and the weight is preferably about 228 grains.

The bill 42 is preferably about 11/16 inch wide at its widest point and about 1 and ⅛ inches long, and it preferably extends forward from the leading edge of body 41 a distance of about ¾ inch. The bill 42 may be made of brass about 0.025 inch in thickness, and it may be polished and/or electroplated with nickel, copper, brass or the like for increased flash. An opening 45 is formed in the leading edge which receives a stainless steel split ring 46, to which is tied a fishing line 47 for the purpose of retrieving lure 40 in the direction of line 47. The bill 42 curves upward and forward on its leading end portion when in the retrieving position shown in FIG. 2, and this curvature aids in elevating the lure over obstructions and prevents snagging or hanging. The amount of upward and forward curvature may vary substantially, but preferably the tangent to the bill 42 is about 23 degrees with respect to the axis of shank 48 of hook 43.

Figure 7:
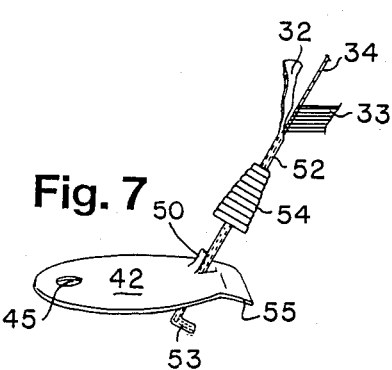
FIG. 7 is a perspective view of the bill of FIG. 6 further illustrating the manner of attaching the flexible spinner blade arm and spring to the lure of the invention.

The bill 42 is also provided with a tab or projection 50 which extends upward and rearward at an angle of about 57 degrees with respect to the axis of the shank 48. The tab 50 is punched from bill 42, thereby forming an opening 51 which receives the lower end portion of a flexible spinner blade cable 52. The end of cable 52 has a crimp 53 formed therein which, when imbedded in the solidified lead forming body 41, prevents it being removed. The cable 52 is preferably about 80 pound test Nylon-coated 1×7 stranded stainless steel leader material about 0.038 inch in thickness, and a suitable cable material is sold by American Fishing Wire Company under the Trademark SURFLON. The Nylon or other suitable protective plastic coating is important as less resistance is offered when passing through or over rocks, vegetation and other obstacles, and damage to the cable 52 is less likely. A cable having the above-described properties is sufficiently rigid to serve as a weedguard and/or snagguard, and yet it is sufficiently flexible to be pushed aside by the impact of a striking fish. FIG. 7 illustrates a cable 52 having a main strand 34 which is wrapped with seven smaller strands, and which is provided with a protective plastic coating 32.

Figure 3:
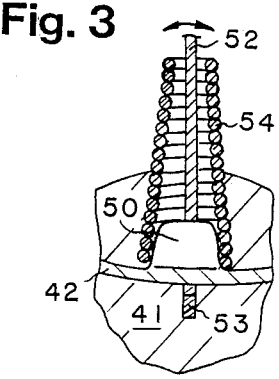
FIG. 3 is an enlarged fragmentary cross-sectional view of the lure of FIG. 2 taken along the lines 3—3 in the direction of the arrows.
Figure 4:
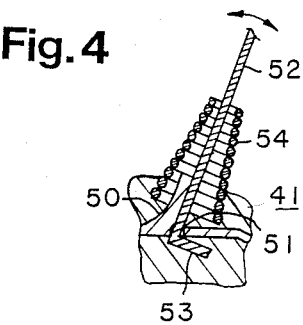
FIG. 4 is an enlarged fragmentary sectional view of the lure of FIG. 5 taken generally along the longitudinal centerline between the lines 4—4.

As is best seen in FIGS. 3 and 4, a spring 54 about ½ inch to ⅝ inch long and formed from tightly coiled music wire about 0.025 inch in diameter is provided, and the lower end of cable 52 is inserted therethrough. The spring 54 has an internal diameter which snugly receives the tab 50 and cable 52 when pushed downward to the position shown in FIGS. 3 and 4, and this frictional fit together with crimp 53 and the solidified lead of body 41, keeps the assembly firmly in place. The structure of the assembly is such that, when the body 41 is molded from molten lead, the molten lead does not enter the internal area formed within the coils of spring 54. Thus, the molten lead does not contact cable 52 with the exception of the crimp 53 and damage thereto caused by the high temperature of the molten lead is prevented. Also, the cable 52 is free to vibrate directly against the internal surfaces of the coils of spring 54, and intense vibration is imparted thereto and in turn to body 41, bill 42, skirt 56 and hook 43.

Figure 9:
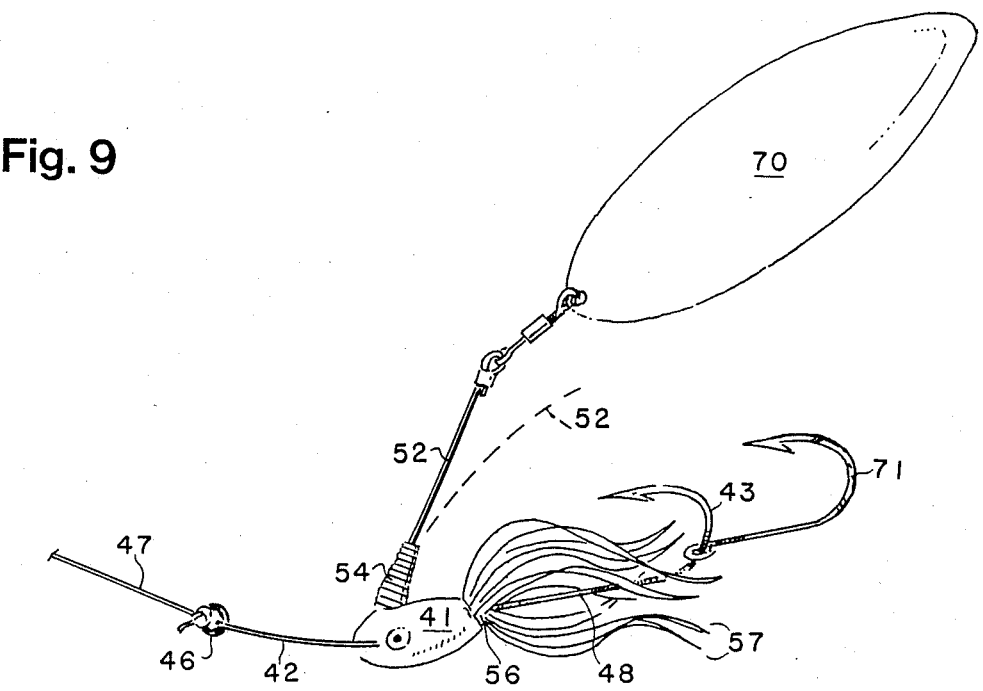
FIG. 9 is a side view of a further presently preferred embodiment of the spinner fishing lure of the invention, and additionally illustrating the use of the largest commercially available spinner blade therewith.
Figure 2:
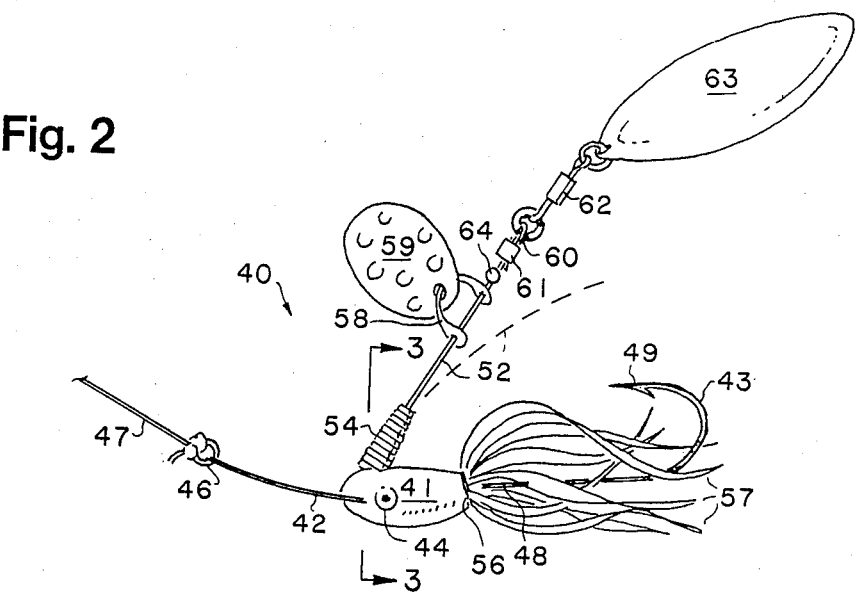
FIG. 2 is a side view of one presently preferred embodiment of the spinner fishing lure of the invention.
Figure 5:
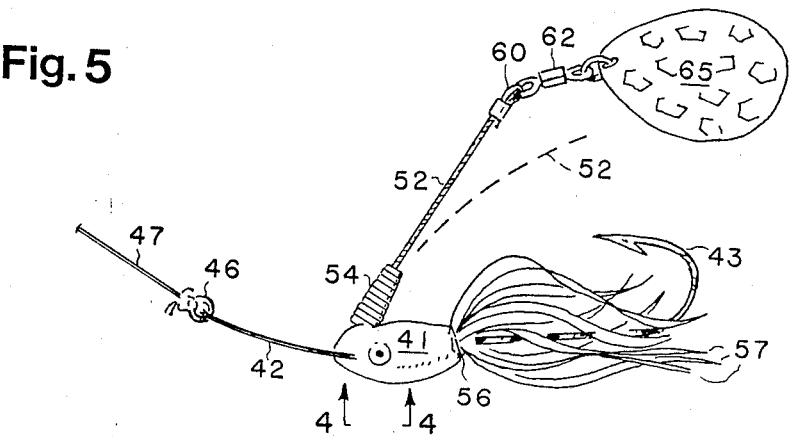
FIG. 5 is a side view of a further presently preferred embodiment of the spinner fishing lure of the invention.
Figure 6:
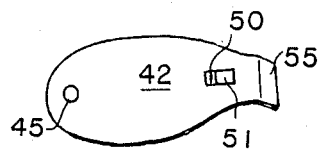
FIG. 6 is a top view of one presently preferred embodiment of the bill used in constructing the lure of the invention.
Figure 8:
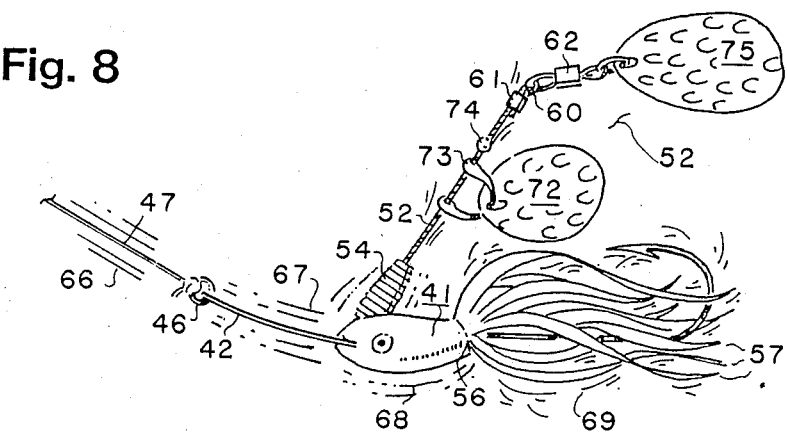
FIG. 8 is a side view of a further presently preferred embodiment of the spinner fishing lure of the invention, and additionally illustrating the extremely vigorous pulsation and/or vibration imparted to the bill, weighted body and skirt as the lure is pulled through the water.

FIGS. 5, 8 and 9 illustrate the use of different types, sizes, and numbers of spinner blades with the lure 40 of FIG. 2, and FIG. 9 further illustrates the use of a tandem hook 71. Inasmuch as the basic lure 40 need not be changed otherwise, in the interest of simplifying the discussion and also additionally illustrating the ability of lure 40 to use all types and sizes of spinner blades interchangeably, the same numerals have been used to refer to like structural components throughout FIGS. 2–9.

Referring now to FIG. 5, a commercially available spinner blade 65 of different size and shape has been substituted for the commercially available spinner blade 63 of FIG. 2, and the clevis 58 and commercially available spinner blade 59 shown in FIG. 2 have been deleted. Otherwise, FIGS. 2 and 5 are the same and the earlier discussion of FIGS. 2, 3, 4, 6 and 7 also applies to FIG. 5.

Referring now to FIG. 8, the commercially available spinner blades 72 and 75 have been substituted for the commercially available spinner blades 59 and 63 of FIG. 2. Otherwise, FIGS. 2 and 8 are the same and the earlier discussion of FIGS. 2, 3, 4, 6 and 7 also applies to FIG. 8. FIG. 8 also illustrates the intense vibration and/or pulsation that is imparted to the lure 40 by the rapidly rotating spinner blades 72 and 75 and the highly flexible arm or cable 52 and flexible spring 54. As may be seen from the vibration and/or pulsation lines running along the length of the arm 52 and spring 54 in FIG. 8, and from the arrows in FIGS. 3 and 4, the flexible arm 52 is caused to vibrate and/or pulsate vigorously back and forth within the interior of spring 54 thereby repeatedly and rapidly striking the interior walls of flexible spring 54 and causing it to likewise vibrate and/or pulsate vigorously. The use of relatively small diameter vibration sensitive steel piano or music wire in constructing arm 52 and spring 54 renders these components highly flexible and maximizes the intensity of the vibration and/or pulsation that is imparted directly to the remainder of the lure 40, namely, to the body 41, bill 42, fishing line 47, hook 43, and the skirt 56 and tails 57, as is illustrated by vibration and/or pulsation lines 66, 67, 68 and 69, respectively. It is important to note that the lower ends of arm 52 and spring 54 are molded into the body 41, and thus substantially all of the vibrational energy developed by blades 72 and 75 is transmitted directly through arm 52 and spring 54 to body 41, and then directly to bill 42, line 47, hook 43, skirt 56 and tails 57. This arrangement assures that almost none of the vibrational energy developed by blades 72 and 75 is lost or rendered ineffective for the intended purposes of the present invention.

Referring now to FIG. 9, the commercially available exceptionally large willow leaf spinner blade 70 has been substituted for the spinner blade 63 of FIG. 2, the clevis 58 and commercially available spinner blade 59 shown in FIG. 2 have been deleted, and a tandem hook 71 has been added behind hook 43. Otherwise, FIGS. 2 and 9 are the same and the earlier discussion of FIGS. 2, 3, 4, 6 and 7 applies to FIG. 5. The tandem hook 71 is added for the purpose of avoiding the missing of strikes by fish as the blade 70 extends substantially past hook 43 and tends to prevent free access thereto.

It may be seen that FIGS. 2, 5, 8 and 9 illustrate the use of a wide variety of sizes and shapes of spinner blades with the basic lure 40 of the invention. For example, these figures illustrate the use of No. 1 and 6 Colorado blades and No. 3½ and 8 willow leaf blades. FIG. 2 illustrates the use of one of the smaller commercially available blades 59, and FIG. 9 illustrates the use of one of the larger commercially available blades 70. In all instances, the lures of FIGS. 2, 5, 8 and 9 run normally and there is no tendency toward rolling or other abnormal operation during retrieval.

The tab or projection 50 preferably extends upward and rearward from bill 42 at substantially the same angle that is desired for arm 52 when the lure 40 is at rest. When spring 54 is placed on tab 50 and arm 52 is inserted therethrough and the assembly molded into body 41, the spring 54 is thereby fixed in the lure 40 at the desired angle and resiliently supports arm 52. Thus, spring 54 aids in maintaining the desired spaced relationship between said trailing end portion of the flexible arm means 52 and said point portion of the hook when lure 40 is at rest and also during retrieval thereof. The spring 54 is also effective to cause said leading end portion of the flexible arm means 52 to resist kinking in the general area adjacent body 42 as the stress placed on arm 52 when fighting a fish is spread over a greater length and arm 52 is protected and tends to merely flex rather than form a kink therein.

Figure 10:
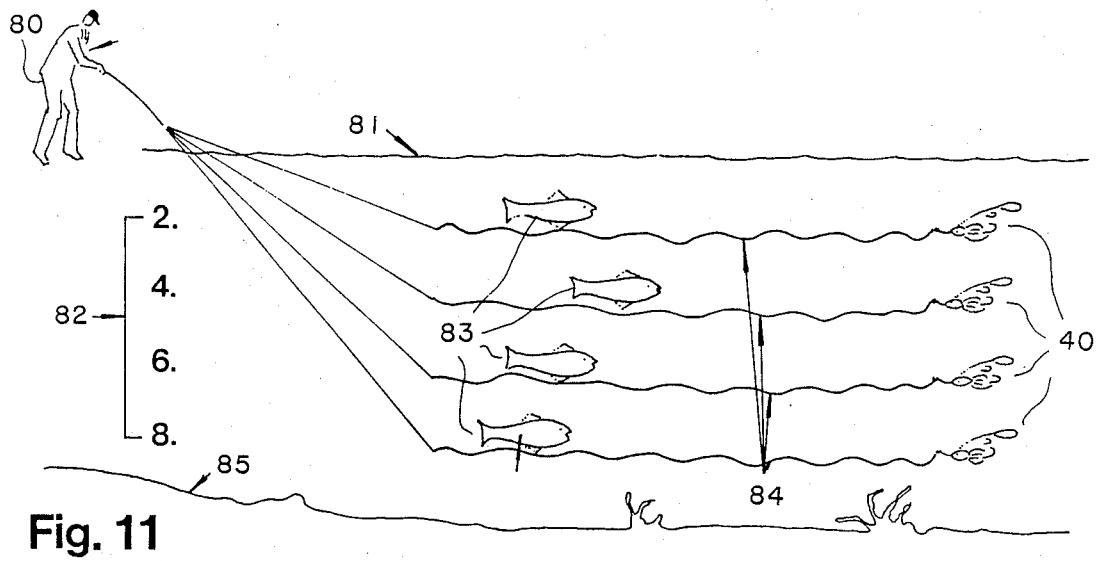
FIG. 10 is a view illustrating the ability of the spinner fishing lure of the invention to hold and retrieve at various desired depths of water.
Figure 11:
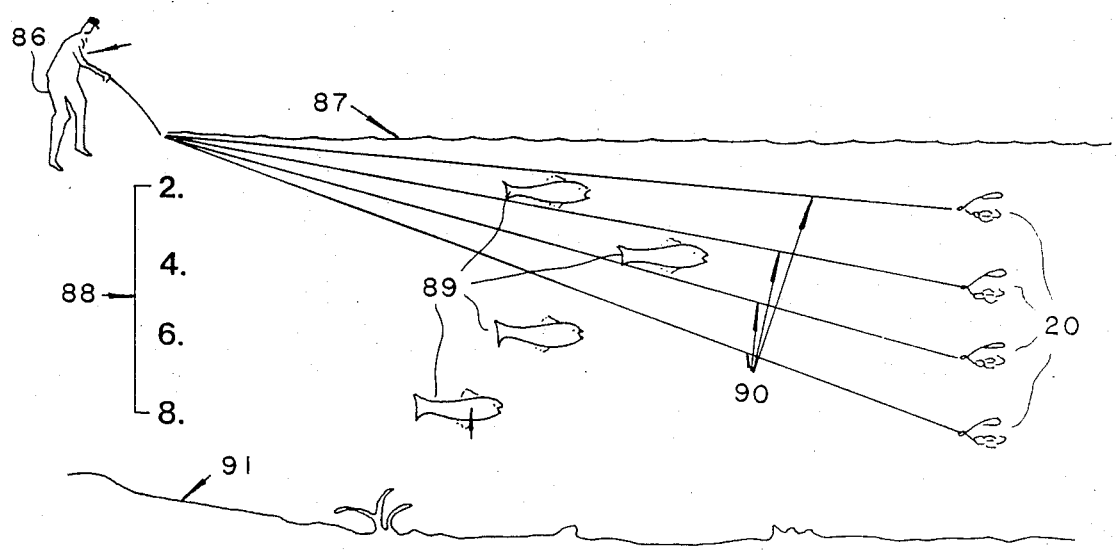
FIG. 11 is a view illustrating that the prior art wire harness spinner lure of FIG. 1 is not capable of holding and retrieving at various depths of water.
Figure 12:
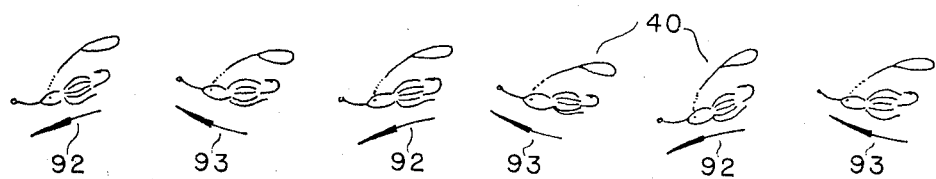
FIG. 12 is a view illustrating the vigorous side-to-side, zig-zag and/or wiggling action imparted to the fishing lure of the invention as it is being retrieved at any desired depth of water and at any desired speed of retrieval.

FIGS. 10, 11 and 12 of the drawings further illustrate certain novel functions and capabilities of the Applicant's lure of FIGS. 2, 5, 8 and 9 and compare it with the prior art lure of FIG. 1. Referring now to FIG. 10, the fisherman 80 has cast the Applicant's lure 40 to the far right side of FIG. 10 where it dropped into the water 81. The lure 40 sinks into the water at the rate of about 1 foot per second, and by counting the seconds before commencing retrieval, the lure 40 is allowed to sink to any desired depth above bottom 85, as is shown on depth scale 82. The desired depth may be pre-selected based on data from high technology fish locating apparatus that is commercially available which indicates the presence of fish 83 and gives the depth thereof. The lure 40 is then retrieved along the lines 84 while maintaining the depth thereof at the depth of fish 83 throughout substantially the entire retrieval step, which greatly increases the chance of a strike by fish 83. As is shown by the waving retrieval lines 84 in FIG. 10, and as is further illustrated in FIG. 12, the lure 40 moves from side-to-side, zig-zags, pulsates and vibrates vigorously throughout substantially the entire retrieval step, and moves first to the right as indicated by arrow 93, and then to the left as indicated by arrow 92. This swimming-like action of lure 40 is very attractive to fish and it further greatly increases the chances of a strike by fish 83.

FIG. 11 illustrates the action of the prior art lure 20 of FIG. 1 under the same conditions of use as discussed above for FIG. 10. The fisherman 86 has cast the prior art lure 20 of FIG. 1 to the far right side of FIG. 11, where it drops into the water 87. The lure 20 is allowed to sink to the desired depth above bottom 91, as is shown on depth scale 88. The desired depths may be pre-selected based on data from high technology fish-finding apparatus that is commercially available which gives the depths of fish 89 and indicates their presence. The lure 20 is then retrieved. However, it is not possible to maintain the initial desired depth of the lure as the depth gradually decreases. As is indicated by lines 90, some of the fish 89 are not sufficiently close to the lure 20 to strike. Also, as is indicated by the straight lines 90, the lure 20 retrieves in a straight line and there is no side-to-side motion imparted thereto as is illustrated in FIG. 12 for the Applicant's lure 40. Thus, the prior art lure 20 is not as attractive to fish 89, and also cannot be retrieved sufficiently close to some of the fish 89 to improve the chances of a strike.

FIG. 13 diagramatically illustrates certain important angular relationships of the component parts of the fishing lure 40 of the invention. Referring now to FIG. 13, in one presently preferred embodiment of the invention the tangent to bill 42 forms about a 23 degree angle with the longitudinal axis of the shank 48 of hook 43. This permits the lure 40 to be retrieved with the leading edge of bill 42 in a sufficiently elevated position so that the bill 42 is capable of riding up and over rocks, logs, vegetation and other obstructions, and the lure 40 does not become lodged or entangled therein. As is shown in solid line, the spinner blade cable 52, which may also be referred to herein as spinner blade arm 52, forms an angle of about 57 degrees with the longitudinal axis of the shank 48 of hook 43 when lure 40 is at rest. When the lure 40 is being retrieved, the flexible spinner blade arm or cable 52 moves generally toward the point of hook 43 to the position shown in phantom line. When in the running position shown in phantom line, the end of the spinner blade arm or cable 52 forms about a 39 degree 39 degree angle with the axis of the shank 48 of hook 43 and is sufficiently close to body 41 and hook 43 to allow the lure 40 to move back and forth as shown in and previously described for FIGS. 10 and 12. The spring 54 prevents the blade arm or cable 52 from moving sufficiently close to the point of hook 43 to catch thereon during retrieval.

While certain preferred embodiments of the invention have been specifically illustrated and described herein, it is understood that modifications may be made therein that are within the scope of the invention. The foregoing detailed description and the accompanying drawings are therefore for purposes of illustration only, and are not intended as being limiting to the spirit or scope of the appended claims

I claim:

1. A spinner fishing lure comprising a weighted body means having leading and trailing portions, fishing line attaching means carried by said leading portion of the body means for attaching a fishing line to said lure, hook means carried by said body means including shank and point portions, said shank portion extending from said trailing portion of the body means and away from said leading portion of the body means and terminating in said point portion, flexible spinner blade arm means carried by said body means having leading and trailing portions, said leading portion of the flexible arm means extending from said body means and then outwardly and away from said leading portion of the body means, said body means and said shank portion of the hook means extending longitudinally of said lure, said trailing portion of the flexible arm means and said point portion of the hook means being spaced from each other and on the same side of said shank portion of the hook means, resilient supporting means including a coiled spring carried by said body means for resiliently supporting said leading portion of the flexible arm means adjacent said body means, said resilient supporting means being effective to cause said leading portion of the flexible arm means to resist kinking adjacent said body means, said resilient supporting means also being effective to aid in maintaining said spaced relationship between said trailing portion of the flexible arm means and said point portion of the hook during retrieval of said lure, and fish attracting spinner blade means carried by said flexible arm means.

2. The fishing lure of claim 1 wherein said coiled spring is attached at one end to said body means and extends outward and rearward therefrom, and said leading end portion of the flexible arm means adjacent said body means extends through the interior of said coiled spring and is resiliently supported thereby.

3. The fishing lure of claim 2 wherein at least one of said coiled spring and said flexible arm means is constructed from steel piano or music wire whereby vibration and pulsation of the lure are increased.

4. The fishing lure of claim 1 wherein an elongated bill means having leading and trailing end portions extends outward from said leading portion of the body means 5. The fishing lure of claim 4 wherein said bill means is curved upward on the leading end portion thereof whereby said lure tends to ride up and over obstacles when being retrieved.

6. The fishing lure of claim 4 wherein said fishing line attaching means includes an opening formed in said leading end portion of said bill means and a ring in said opening for attaching a fishing line thereto.

7. The fishing lure of claim 4 wherein said body means is formed from lead-containing metal, and said body means is molded around said trailing end portion of the bill means.

8. The fishing lure of claim 7 wherein said trailing end portion of the bill means includes means for attaching said arm means and said coiled spring thereto prior to molding said body means therearound.

9. The fishing lure of claim 8 wherein said attaching means includes an upwardly and rearwardly extending projection on said trailing end portion of the bill means and an opening in said bill means adjacent thereto, the lower end of the coiled spring is inserted onto said projection, the said leading end portion of the arm means is inserted through said coiled spring and said opening, and the relative sizes of said projection and the interior of said coiled spring are such that the coiled spring and said leading end portion of the arm means are held firmly in place on said projection whereby said body means may be molded therearound.

10. The fishing lure of claim 9 wherein said bill means is curved upward on the leading end portion thereof and forms a tangent of about 23 degrees with the axis of said shank portion of the hook, said arm means when at rest forms an angle of about 57 degrees with the axis of said shank portion of the hook, and said arm means forms an angle of about 39 degrees with the axis of said shank portion of the hook when the lure is being retrieved.

11. A spinner fishing lure comprising an elongated weighted body means having leading and trailing end portions, an elongated bill means having leading and trailing end portions, said bill means extending from said leading end portion of the body means and being fixedly connected adjacent its said trailing end portion to said body means, an elongated hook means including shank and point portions, said shank portion extending from said trailing end portion of the body means and being fixedly connected to said body means, an elongated flexible spinner blade arm means having leading and trailing end portions, said leading end portion of the flexible arm means being fixedly connected to said body means at a position removed from the respective outer ends of said leading and trailing end portions of said body means, said flexible arm means being angularly disposed and extending outwardly from said body means and toward said trailing end portion of said body means, said elongated body means and hook means extending generally longitudinally of said lure and the longitudinal axes thereof lying in substantially the same plane, said flexible arm means and said point portion of the hook means being on the same side of said longitudinal axes thereof and spaced from each other, resilient supporting means including a coiled spring carried by said body means for resiliently supporting said leading end portion of the flexible arm means adjacent said body means, said resilient supporting means being effective to cause said leading end portion of the flexible arm means to resist kinking adjacent said body means, said resilient supporting means also being effective to aid in maintaining said spaced relationship between said trailing end portion of the flexible arm means and said point portion of the hook during retrieval of said lure, means for attaching a fishing line to said leading end portion of the bill, and fish attracting spinner blade means carried by said flexible arm means.

12. The fishing lure of claim 11 wherein said coiled spring is attached at one end to said body means and extends outward and rearward therefrom, and said leading end portion of the flexible arm means adjacent said body means extends through the interior of said coiled spring and is resiliently supported thereby.

13. The fishing lure of claim 12 wherein at least one of said coiled spring and said flexible arm means is constructed from steel piano or music wire whereby vibration and pulsation of the lure are increased.

14. The fishing lure of claim 12 wherein said coiled spring has an internal diameter which is substantially larger than the external diameter of said leading end portion of the flexible arm means whereby said flexible arm means is free to vibrate vigorously therein.

15. The fishing lure of claim 11 wherein said bill means is curved upward on the leading end portion thereof whereby said lure tends to ride up and over obstacles when being retrieved.

16. The fishing lure of claim 11 wherein said fishing line attaching means includes an opening formed in said leading end portion of said bill means and a ring in said opening for attaching a fishing line thereto.

17. The fishing lure of claim 11 wherein said body means is formed from lead-containing metal, and said body means is molded around said trailing end portion of the bill means.

18. The fishing lure of claim 17 wherein said trailing end portion of the bill means includes means for attaching said arm means and said coiled spring thereto prior to molding said body means therearound.

19. The fishing lure of claim 18 wherein said attaching means includes an upwardly and rearwardly extending projection on said trailing end portion of the bill means and an opening in said bill means adjacent thereto, the lower end of the coiled spring is inserted onto said projection, the said leading end portion of the arm means is inserted through said coiled spring and said opening, and the relative sizes of said projection and the interior of said coiled spring are such that the coiled spring and said leading end portion of the arm means are held firmly in place on said projection whereby said body means may be molded therearound.

20. The fishing lure of claim 19 wherein said bill means is curved upward on the leading end portion thereof and forms a tangent of about 23 degrees with the axis of said shank portion of the hook, said arm means when at rest forms an angle of about 57 degrees with the axis of said shank portion of the hook, and said arm means forms an angle of about 39 degrees with the axis of said shank portion of the hook when the lure is being retrieved.

* * * * *